United States Patent
Karapetkov et al.

[11] Patent Number: 6,081,836
[45] Date of Patent: Jun. 27, 2000

[54] METHOD FOR THE TRANSMISSION OF INFORMATION PACKETS BETWEEN EMULATED LANS USING ADDRESS RESOLUTION

[75] Inventors: Stefan Karapetkov; Ingrid Fromm; Bernhard Petri, all of München, Germany

[73] Assignee: Siemens Aktiengesellschaft, Munich, Germany

[21] Appl. No.: 08/981,531

[22] PCT Filed: Jul. 1, 1996

[86] PCT No.: PCT/DE96/01165

§ 371 Date: Dec. 22, 1997

§ 102(e) Date: Dec. 22, 1997

[87] PCT Pub. No.: WO97/02682

PCT Pub. Date: Jan. 23, 1997

[30] Foreign Application Priority Data

Jul. 5, 1995 [DE] Germany ........................ 195 24 504
Sep. 28, 1995 [DE] Germany ........................ 195 36 269

[51] Int. Cl.⁷ .............................. G06F 15/16; G06F 9/00
[52] U.S. Cl. ..................... 709/218; 709/203; 709/236; 709/238; 709/245; 370/400; 370/395; 370/396; 370/398; 395/500; 395/527; 395/392; 395/118
[58] Field of Search ............................. 395/500, 527, 395/392, 118, 178; 709/203, 218, 236, 238, 245, 249; 370/400, 395, 396, 398

[56] References Cited

U.S. PATENT DOCUMENTS 5,329,527 7/1994 Ujuhashi ............................. 370/397
5,539,736 7/1996 Johnson et al. ..................... 370/402
5,581,552 12/1996 Civanlar et al. .................... 370/396
5,600,644 2/1997 Chang et al. ....................... 370/404
5,812,552 9/1998 Arora et al. ........................ 370/401

OTHER PUBLICATIONS

H. Jonathan Chao et al, IEEE Communications Magazine, Aug. 1994, "IP on ATM Local Area Networks," pp. 52–59.

Truong et al, IEEE Communications Magazine, May 1995, "LAN Emulation on an ATM Network," pp. 70–85.

*Primary Examiner*—Frank J. Asta
*Assistant Examiner*—Beatriz Prieto
*Attorney, Agent, or Firm*—Hill & Simpson

[57] ABSTRACT

Method for the transmission of information packets between a source LEC of a first ELAN and a destination LEC of a second ELAN, having the following method steps: determination of the destination ATM address by transmission of an address resolution request of the source LEC to the second ELAN via a CLS wideare network offering a connectionless service and resolution of the destination MAC address in the second ELAN into the appertaining ATM address; initiation of a connection setup between source LEC and destination LEC via an ATM network ranking higher than the first ELAN and the second ELAN upon employment of the identified destination ATM address; and transmission of the information packets via the higher-ranking ATM network. In one exemplary embodiment, the determined ATM address is transmitted to the first ELAN via the CLS wide-area network as address resolution response and is transmitted thereat to the source LEC, and the source LEC initiates a connection setup to the destination LEC.

20 Claims, 3 Drawing Sheets

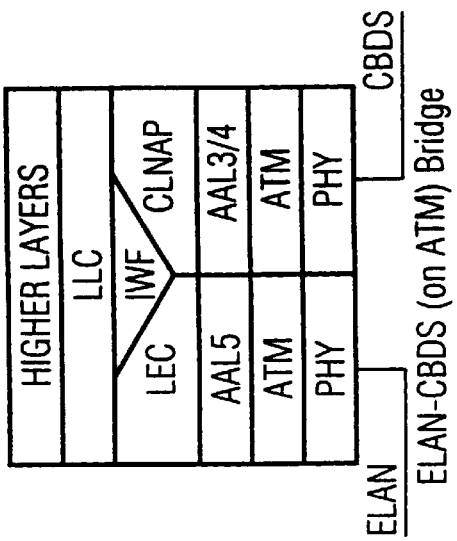

FIG 3A

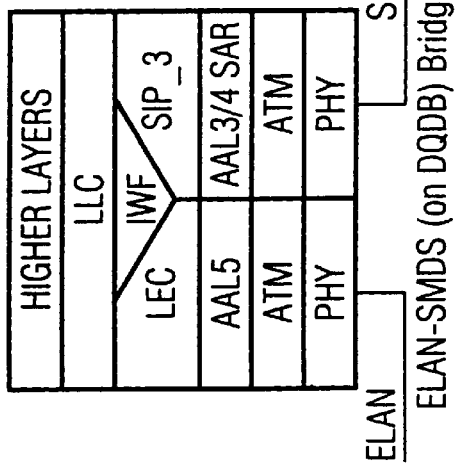

FIG 3B

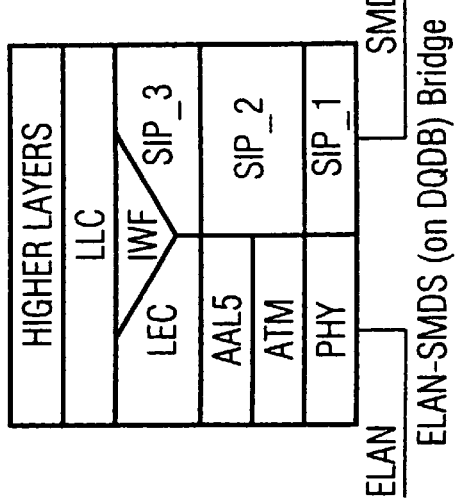

FIG 3C

| AAL | ATM Adaptation Layer | ATM | Asynchronous Transfer Mode |
| CBDS | Connectionless Broadband Data Service | CLNAP | Connectionless Network Access Protocol |
| DQDB | Distributed Queue Dual Bus | ELAN | Emulated Local Area Network |
| IWF | Interworking Function | LEC | LAN Emulation Client |
| LLC | Logical Link Control | PHY | Physical Layer |
| SAR | Segmentation and Assembling Sub-Layers | SIP_1 | SMDS Interface Protocol Layer 1 |
| SIP_2 | SMDS Interface Protocol Layer 2 | SIP_3 | SMDS Interface Protocol Layer 3 |
| SMDS | Switched Multi-Megabit Data Service | | |

METHOD FOR THE TRANSMISSION OF INFORMATION PACKETS BETWEEN EMULATED LANS USING ADDRESS RESOLUTION

BACKGROUND OF THE INVENTION

The invention is directed to a method for the transmission of information packets between a source LAN emulation client LEC of a first ELAN and an LAN emulation client of a second ELAN.

ELAN stands for emulated LAN as described, in particular, in the specification 94-0035R9, "LAN Emulation Over ATM: Version 1.0" of the LAN Emulation SWG Drafting Group of the ATM Forum of Jan. 6, 1995, Bill Ellington, editor. This is thereby an approach of the ATM Forum to the migration of current LANs to ATM networks. ATM thereby means "Asynchronous Transfer Mode", i.e. asynchronous data or, respectively, information transmission methods. LAN is an abbreviation of "Local Area Network". LANs are datagram-oriented local networks that are described in, among other references, the article by David D. Clark, Kenneth D. Progran and David P. Reed, "An Introduction to Local Area Networks" in Proceedings of the IEEE, Vol. 66, No. Nov. 11, 1978, pages 1497 through 1517. LANs are also described in ISO/IEC TR 8802-1, "Overview of LAN-Standards". LANs offer a connectionless service, what is referred to as the MAC service. MAC thereby stands for "Media Access Control". By contrast to this connectionless service, ATM technology is connection-oriented. When the protocols of the higher layers developed for LANs are to be used in emulated LANs on the basis of an ATM network, the properties of the connectionless MAC service must be produced in this ATM network. The LAN emulation according to the aforementioned specification realizes the MAC service in the local ATM network and thus defines a single emulated LAN, called ELAN below. The standard LAN protocols such as LLC, TCP/IP, SPX/IPX or TP/CLNP can be used in this ELAN.

The LAN emulation supports the two most frequently employed AN standards, namely Ethernet according to IEEE 802.3 and Token ing according to IEEE 802.5, whereby three frame lengths are supported given token ring. The addressing of every LAN station ensues on the basis of a destination MAC address that is unambiguous worldwide. For the transmission of information between LANs, the address is handed over from a high layer are. For the description of the information path, token ring LANs employ what are referred to as route descriptors in the frame header in addition to MAC addresses. The frame can be conveyed to the destination within token ring LANs on the basis of such a descriptor.

Only MAC addresses shall be mentioned below.

For emulation of an LAN in an ATM network, the LAN emulation must, among other things, resolve destination MAC address into destination ATM addresses, realize multicast and broadcast, i.e. a distribution of information to as plurality of or to all subscribers, as well as assure the transmission of LAN emulation frames in the proper sequence.

The LAN emulation has a client-server configuration. The client side is called LAN emulation client LEC and the server side is called LAN emulation service. The LAN emulation service is composed of LAN emulation server LES, broadcast-and-unknown server BUS and LAN emulation configuration server LECS. The LAN emulation client receives the destination MAC address from a higher-ranking layer, for example the LLC layer, and must find the corresponding ATM address, in order to subsequently initiate the setup of a direct ATM connection to the destination by signalling. The signalling can thereby ensue, for example, according to the ITU-T Recommendation Q.28311Q.2971. An LAN emulation client can be realized in the software or in the hardware of the stations that participate in the LAN emulation.

An LAN emulation server LES maintains a table with all MAC addresses that are reported in the emulated LAN, for example in the framework of a configuration, and with the corresponding ATM addresses. The communication between the LAN emulation clients and the LAN emulation client ensues according to an LAN emulation address resolution protocol that, conforming to the English designation LAN Emulation Address Resolution Protocol, is referred to as LE_ARP. When an LAN emulation client does not know the destination ATM address of a destination MAC address, then it sends an inquiry with the destination MAC address to the LAN emulation server. Such an inquiry for address resolution is referenced LE_ARP request. When the LES can resolve the destination ATM address, it replies with LE_ARP response. When it cannot, it sends the request to further LAN emulation clients.

When an LAN emulation client receives an address resolution response LE_ARP response, then it sets up an ATM-UBR connection to the ATM address contained therein and sends a unicast frame. UBR thereby denotes "Unspecified Bit Rate", i.e. indicates that the bit rate is not specified. A unicast frame is an information or, respectively, data packet with a single addressee. In the transmission of frames within an ELAN, a distinction is made between unicast frame to one receiver and multicast or broadcast frame to several or all receivers. An ATM-UBR connection is maintained for 20 minutes from the last transmitted frame so that further frames can be sent to the same receiver in a simple way. To this end, the variable C12 is referenced in point 5.1.1 of the LAN emulation specification. The destination ATM addresses of destination MAC addresses is stored for a certain length of time in the LAN emulation client with the assistance of a cache mechanism. When there is no connection to a destination LAN emulation client but the destination ATM address is known in the sender LAN emulation client, a sender LAN emulation client LEC can set up a connection without address resolution request and send a unicast frame.

Multicast frames to a group of subscribers or, respectively, LAN emulation clients and broadcast frames to all subscribers or, respectively, LAN emulation clients LECen are sent to the aforementioned BUS. Within an ELAN, the BUS maintains connections to all LEC for the arrived frames to the addressees.

Every LAN can be reported as what is referred to as proxi-LEC. A proxi-LAN emulation client receives all address resolution requests LE_ARP request that an LES cannot resolve. A proxi-LEC also receives all multicast and all broadcast frames.

The advantage of ATM technology is to be seen, among other things, therein that direct connections with flexible bandwidth can be set up between the communication parties. Such direct connections guarantee minimum time delays and a high information transmission rate. This advantage of ATM technology is utilized in the LAN emulation for unicast frames. Various concepts for connecting local ATM networks such as, for example, ELANs via a wide-area ATM network are known in the article, "Interconnect Emulated LANs with Wide Area ATM networks" by Peter T. P. Chang and Bill Ellington, ATM Forum Technical Committee of November 29 through Dec. 2, 1994. In a first concept, a plurality of ELANs are thereby connected to a wide-area ATM network, whereby the address resolution and the data transmission are undertaken via a single LAN emulation server and a single BUS. This concept leads to an enormous traffic volume for the realization of the broadcast function. The address resolution delay times in such a network are extremely high.

A further concept provides that ELANs be respectively connected to a wide-area ATM network via remote bridges. Either all remote bridges are thereby connected to one another via permanent virtual circuits PVC or the remote bridges are dynamically connected to one another with the assistance of an ATM signalling upon employment of an address resolution server. The transmission possibilities are thereby limited by the transmission possibilities of the remote bridges and the bandwidth of the permanent virtual circuits between two remote bridges. The remote bridges are flooded with broadcast and unknown servers of remote ELANs insofar as the remote bridge thereof does not respectively know the address of the remote bridges allocated to the destination MAC addresses.

A further concept provides that, instead of remote bridges, routers be provided, a mixture of bridge and router. In this case, these routers fulfill the function of an LAN emulation bridge at the ELAN side and fulfill the functions of a router at the side of the ATM wide-area network. As a result thereof, the broadcast problems are reduced; however, a limitation of the transmission possibilities via the ATM wide-area network due to the transmission possibilities of the routers and of the permanent virtual circuits continues to exist.

A further concept provides that the LAN emulation servers of the individual ELANs as well as the BUS of the individual ELANs be connected to one another by direct connections. This, however, leads to a great plurality of direct connections and to a high traffic volume between the LAN emulation servers and the BUS of the individual ELANs. The traffic volume thereby increases linearly with the plurality of connected ELANs. A further concept provides that the LAN emulation servers of the individual ELANs as well as the BUS of the individual ELANs be connected to a higher-ranking LAN emulation server or, respectively, to a higher-ranking BUS via direct connections. This, however, likewise leads to a great plurality of direct connections and to a high traffic volume. The multi-layer nature of BUS and higher-ranking BUS or, respectively, LES and higher-ranking LES also leads to time delays.

SUMMARY OF THE INVENTION

An object of the invention is to offer a method for the communication of information packets between a source LEC of a first ELAN and a destination LEC of a second ELAN.

When, within an ELAN, information is to be transmitted from one LAN emulation client to another LAN emulation client, the source LEC usually initiates an ATM connection setup to the destination LEC. The destination ATM address is required therefor. The source LEC knows a destination MAC address from higher layers. Moreover, a destination ATM address for the destination MAC address can be deposited in its memory. When no destination ATM address is deposited, the source LEC normally forwards an address resolution request LE_ARP_Request to an LAN emulation server of the ELAN. When the client allocated to the destination MAC address does not belong to the ELAN of this LAN emulation server, this LAN emulation server cannot resolve the ATM address, i.e. cannot answer the address resolution request.

Inventively, the first and the second ELAN are connected to a wide-area network (regionally and/or globally) that offers a connectionless service such as, for example, SMDS (Switched Multi-megabit Data Service) or CBDS (Connectionless Broadband Data Service). Insofar as no explanations to the contrary are provided, what is always meant for the sake of simplicity below and in the patent claims by wide-area network is a wide-area network offering a connectionless service, i.e. a CLS wide-area network (regional and/or global).

When the destination MAC address to be resolved is allocated to at least one LAN emulation client of a second ELAN, then the information transmission is inventively enabled with the following method steps:

determination of the destination ATM address by transmission of an address resolution request of the source LEC to the ELAN via a CLS wide-are network offering a connectionless service and resolution of the destination MAC address in the second ELAN into the appertaining ATM address;

initiation of a connection setup between source LEC and destination LEC via an ATM network ranking higher than the first ELAN and the second ELAN upon employment of the identified destination ATM address;

transmission of the information packets via the higher-ranking ATM network.

In one exemplary embodiment, the identified ATM address is transmitted via the CLS wide-area network as address resolution response to the first ELAN and is transmitted thereat to the source LEC, and the source LEC initiates a connection setup to the destination LEC.

Preferably, the destination ATM address is thereby resolved with the following method steps:

encapsulation of the address resolution request present in the first ELAN as ELAN frame in a frame format of the CLS Wide-area network with an E-164 address allocated to the destination MAC address in the frame header part;

handing over this encapsulated address resolution request to the CLS wide-area network and transmission to the second ELAN;

de-encapsulation of the encapsulated address resolution request and handover to an LAN emulation server of the second ELAN in the ELAN frame format;

resolution of the destination MAC address into an appertaining ATM address by this server of the second ELAN and output of an address resolution response;

encapsulation of this address resolution response into the frame format of the CLS wide-area network and transmission to the first ELAN;

de-encapsulation of the encapsulated address resolution response and handover to the source LEC.

When a single destination LEC is allocated to the destination MAC address, i.e. the transmission of unicast frames is planned, then, according to the aforementioned "LAN-Emulation over ATM-Specification", an address resolution request is sent from the source LEC to the LAN emulation server of the local ELAN. Since the LAN emulation server only knows the local ATM addresses, it cannot resolve the destination ATM address. The local LAN emulation server therefore hands over the address resolution request of the source LRC to all proxi-LEC signed on in the local ELAN. In a beneficial development of the invention, the individual ELANs are therefore respectively connected via a specific LAN emulation client to the wide-area network offering a connectionless service. This access LEC is respectively preferably signed on as proxi-LEC in its ELAN.

When the destination MAC address to be resolved is allocated to at least one LAN emulation client of a second ELAN, then the address resolution request is inventively transmitted to the second and, potentially, to further remote ELANs via the CLS wide-area.

When the individual ELANs are respectively connected via an access LEC to the network offering a connectionless service, then the transition between an ELAN and the CLS wide-area network is preferably formed by an interworking function IWF that is arranged between the CLS wide-area network (T-reference point) and an access LEC of the respective ELAN. Such an interworking function can be a bridge or a router.

A bridge as interworking function has, for example, an address memory for MAC addresses of the ELAN and E.164 addresses of the CLS wide-area network allocated to one another and a memory for an E.164 address allocated to the transition from the CLS wide-area network to the bridge.

A simple embodiment of such a bridge can provide that address resolution request frames and unicast as well as multicast data frames are discarded when no allocated E.164 address is stored for their destination MAC address in the address memory, that address resolution request frames and unicast as well as multicast data frames are forwarded to the CLS wide-area network when an allocated E.164 address for their destination MAC address is stored in the address memory, and that data frames and address resolution request frames whose destination MAC address is a local broadcast MAC address are discarded. Respectively in common with the frame, the conversion function hands over the E.164 address belonging to the destination MAC address to the interface to the CLS wide-are network. The conversion function also hands over the E.164 address allocated to the source MAC address, at least for address resolution requests frames. Frames coming from the CLS wide-area network are handed over to the interface (layer LEC) to the ELAN.

Such a conversion function provides that only address resolution requests for MAC addresses that are deposited in the address memory in common with the allocated E.164 address can be resolved. As a result thereof, only address resolution requests that are sure to be resolved proceed into the CLS wide-area network.

When address resolution requests for MAC addresses whose allocated E.164 addresses are not deposited in the address memory should also be capable of being resolved, then said conversion function can be configured in order to forward address resolution request frames for whose destination MAC address no E.164 address (global E.164 group address) is stored in the address memory to the CLS wide-area network with a global E.164 group address allocated to all ELANs. Controlled, for example, by the group address agent GAA of the CLS wide-area network, such an address resolution request is then sent to all ELANs. Since the address resolution request frames are small, the CLS wide-area network is only slightly burdened by this measure.

Particularly for preventing the sending of unicast data frames in the CLS wide-area network whose Atm address was not known to the source LEC upon dispatch and that therefore proceed to the access LEC as unknown data frames via the broadcast and unknown server, it can be provided in a modification of the disclosed conversion function that all unicast data frames be discarded. Since the address resolution request frame allocated to such a unicast data frame without ATM address is transmitted via the CLS wide-area network, the source LEC receives the ATM address required for an ATM connection setup and can initiate the connection setup. When a protection mechanism of a higher layer determines that a faulty transmission of at least the unknown data frame is present, a repeated transmission via the an ATM connection can ensue.

A described conversion function can preferably be configured in order to forward data frames and address resolution request frames whose destination MAC address is a global broadcast MAC address to the CLS wide-area network. The E.164 address allocated thereto corresponds to the aforementioned E.164 address that addresses all connected ELANs. This measure makes it possible to designationally transmit broadcast frames via the CLS wide-area network even though local broadcast frames are discarded.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 3A–C respectively show a protocol stack given coupling of ELANs by SMDS network or, respectively, CBDS network.

DESCRIPTION OF THE PREFERRED EMBODIMENTS

Figure 1:
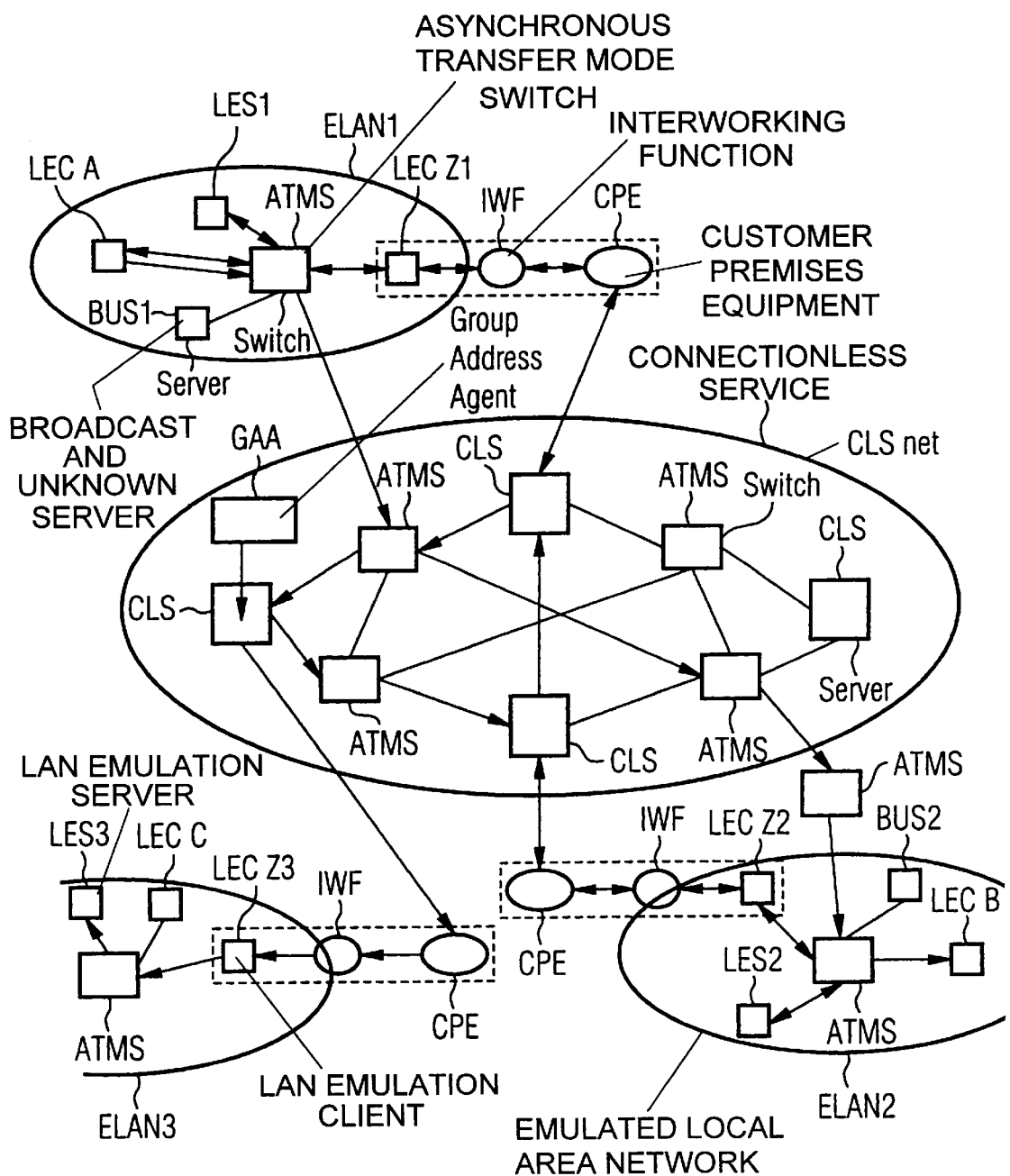
FIG. 1 shows the transmission of LE_ARP request/response by the CLS network and ATM connection setup from the sender to the receiver.

The connectionless service or CLS service can be realized with various technologies (for example, DQDB, ATM, FR). The service is described in the ITU-T Recommendation F.812. Known realizations are the switched multi-megabit data service (SMDS) described in specifications of Bellcore, SMDS Interest Group (SIG) and European SMDS Interest Group (ESIG), as well as the connectionless broadband data service (CBDS) defined in ETSI Standard 300 217 and ITU-T Recommendation I.364. CLS has become widespread worldwide due to these realizations. Systems that offer this service are built by many manufacturers in the field of telecommunication.

The service is envisioned for worldwide data communication. At every access to the CLS network, one or more CLNAP addresses according to E.164 (E.164 address) are assigned (CLNAP=connection network access protocol).

A destination CLNAP address (E.164 address) is attached (encapsulation) to an incoming unicast frame with static or dynamic allocation tables on the basis of its destination MAC address and the encapsulated frame (also called CLS packet) is conducted to this CLNAP address.

For better understanding, the addresses in the ELAN are called unicast or, respectively, multicast/broadcast MAC addresses, but individual and group addresses shall be referred to in the CLS network.

Each CLS packet is transmitted independently of the others in the CLS network. The networks sees to the proper sequence of the CLS packets.

Under certain conditions (see prETS 300 478, 300 479), the CLNAP PDUs are encapsulated in CLNIP PDUs (CLNIP=connectionless network interface protocol).

The handling of multicast traffic in the CLS network is realized in the following way. What are referred to as group address agents (GAAs) contain tables with the individual CLNAP addresses that belong to a CLNAP group address. Each CLS packet that has a group address as destination address is conducted to the corresponding group address agent. When encapsulation was carried out, the same group address resides in the fields "CLNAP destination address" and "CLNIP destination address".

The GAA resolves the group address of the incoming CLS packet into individual CLNIP addresses, generates copies of the original packet and attaches to corresponding individual address to each copy as CLNIP address.

The "CLNAP destination address" field remains unmodified, so that the receiver can learn about the original group address. The LAN emulation describes an individual emulated LAN. No solutions are currently known for the coupling of ELANs. For performance reasons, the mechanisms described in the LAN emulation for address resolution and for the realization of multicast/broadcast in the WAN region cannot simply be transferred.

Methods for coupling ELANs upon application of the invention are described below:

A first example provides the transmission of address resolution requests or, respectively, address resolution responses LE__ARP Request/Response by a network offering a connectionless service and, subsequently, an ATM connection setup from sender to receiver.

An advantage of the LAN emulation is the setup of a direct Atm connection between sender and receiver, as referenced with data direct VCC in the LAN emulation specification. The improvement of the invention of this example therefore proposes that the destination MAC address for the unicast traffic be resolved into the ATM address upon employment of a network such as, for example, SMDS or CBDS that offers a connectionless service and that a direct ATM connection to the destination then be set up.

Figure 2:
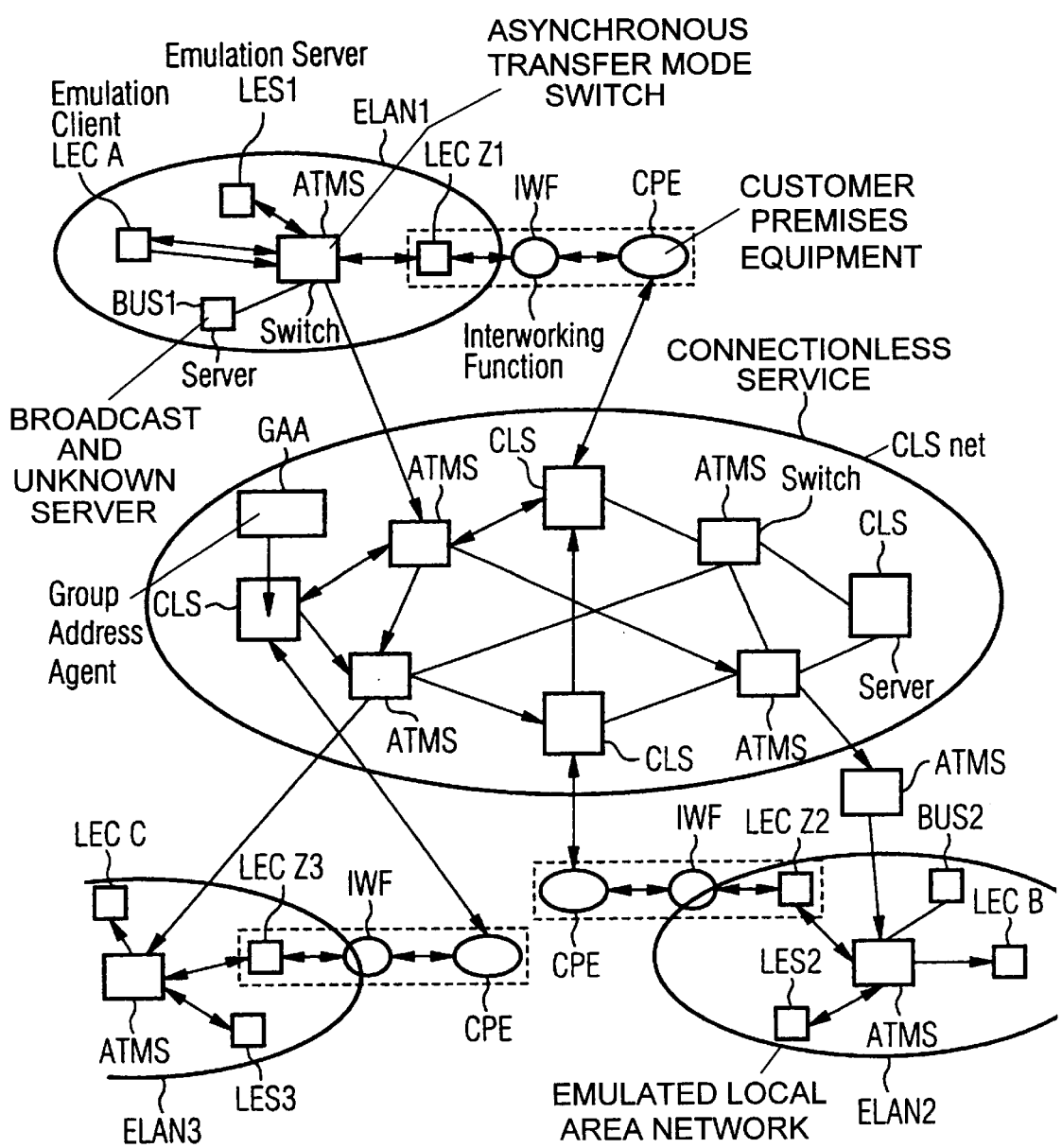
FIG. 2 shows the resolution of the multicast/broadcast destination MAC address by the CLS network and setup of point-to-point or point-to-multipoint ATM connections from the sender to all receivers.

In the same way, FIGS. 1 and 2 show three ELANs ELAN1, ELAN2 and ELAN3 respectively having an LAN emulation server LES, an ATM switching means ATMS, an LAN emulation client LEC A, LEC B, LEC and a specific LAN emulation client LEC Z1, LEC Z2, LEC Z3 that is referred to below as access LEC and that enables then respective ELAN ELAN1, ELAN2 or, respectively, ELAN3 to have access via a customer premises equipment CPE to a network CLSnet (also shown) that offers a connectionless service. Each customer premises equipment CPE thereby has an interworking function IWF allocated to it for the conversion of a destination MAC address into an E.164 address of the customer premises equipment CPE of the ELAN in which the LAN emulation client to whom the destination MAC address is allocated is located or for the conversion of an E.164 group address of all ELANs. In the exemplary embodiments of FIGS. 1 and 2, the network CLSnet offering a connectionless service is realized with the assistance of a higher-ranking (spatially higher-ranking, i.e. regional or global) ATM network with ATM switching equipment ATMS. The type of realization of the network CLSnet offering a connectionless service, however, has no influence on the invention.

The broadcast and unknown server BUS1, BUS2, BUS3 of the ELAN1, ELAN2 and ELAN3 are also respectively shown in FIG. 1. As shown by an overlapping frame, access LEC, interworking function IWF and customer premises equipment CPE in the illustrated example respectively form a bridge whose bridge function is the interworking function IWF.

The network CLSnet offering a connectionless service contains a server (connectionless server) CLS offering a connectionless service and a group address agent GAA.

In FIG. 1, the signal flows of the address resolution requests LE__ARP Request and address resolution responses LE__ARP Response communicated in the framework of the LAN emulation address resolution protocol LE__ARP are indicated by a thin line with arrow in signal flow direction. The signal flow of data from the LAN emulation client LEC A to the LAN emulation client LEC B via an Atm connection is indicated in FIG. 1 with a bold face line with arrow in signal flow direction.

Accordingly, it can be seen in FIG. 1 that an address resolution request LE__ARP Request from the LAN emulation client LEC A of the ELAN1 is transmitted via the ATM switching equipment ATMS of this ELAN1 to the LAN emulation server of the ELAN 1 and from the latter via the ATM switching equipment ATMS to the access LEC LEC Z1. From the access LEC LEC Z1, the address resolution request LE__ARP proceeds to the customer premises equipment, is converted into a different form therein and transmitted via a connectionless server CLA, an ATM switching equipment ATMS and another connectionless server CLA to the group address agent GAA, and is transmitted from the latter directly to the customer premises equipment CPE of the ELAN3 as well as to the customer premises equipment CPE of the ELAN2 via a further ATM switching equipment ATMS and a further connectionless server CLS. In each of the ELANs ELAN2 and ELAN3, the address resolution request LE__ARP Request is then transmitted to the LAN emulation server LES2, LES3 of the ELAN via an IWF and an access LEC LEC Z2, LEC Z3. The LAN emulation server LES2 of the ELAN2 can resolve the destination MAC address into the ATM address and communicate it to the LAN emulation client LEC A via the ATM switching equipment ATMS, the access LEC LEC Z2, the customer premises equipment CPE of the ELAN2, two connectionless servers CLS of the network CLSnet offering a connectionless server, the customer premises equipment CPE of the ELAN1, the access LEC LEC Z1 of the ELAN1 and the ATM switching equipment ATMS of the ELAN 1.

When the LAN emulation client LEC A knows the destination ATM address, it can set up a direct connection to the destination LAN emulation client LEC B in the ELAN2 via an ATM network illustrated in FIG. 1 by a plurality of ATM switching equipment ATMS, as shown in FIG. 1 by bold face lines between the LAN emulation client LEC A and the LAN emulation client LEC B as well as intervening ATM switching equipment ATMS.

An LAN emulation client LEC Z1, LEC Z2 or, respectively, LEC Z3 of each emulated LAN ELAN1, ELAN2, ELAN3 has access (CPE) to a network CLSnet offering a connectionless service. When the LAN emulation client LEC A of the ELAN1 would like to send a unicast frame to the LAN emulation client LEC B of the ELAN2 but does not know the destination ATM address, it sends an address resolution request LE_ARP Request to the LAN emulation server LES of the ELAN1. When the LAN emulation server LES of the ELAN1 has no entry for the destination MAC address in its table, it must forward this address resolution request LE_ARP Request to the access LEC LEC Z1 of the ELAN1. For example, this can be realized by signing the access LEC LEC Z1 on as proxy at the LAN emulation server LES of the ELAN1.

Like the other access LECs LEC Z2, LEC Z3 of the other emulated ELANs ELAN2 and ELAN3, the access LEC LEC Z1 of the ELAN1 is respectively conneted to a customer premises equipment of a network CLSnet offering a connectionless service. The transition from the access LEC LEC Z1, LEC Z2, LEC Z3 to a network CLSnet offering a connectionless service is thereby realized with the assistance of an aforementioned interworking function IWF described in greater detail later that transforms every address resolution request LE_ARP Request or, respectively, address resolution response LE_ARP Response that arrives at an access LEC LEC Z1, LEC Z2, LEC Z3 and for which it has an entry (E.164 address) for the destination MAC address into the format of a packet (CLNAP packet) of the network CLSnet offering a connectionless service and hands this request or, respectively, response over to the network CLSnet offering a connectionless service.

When the interworking function has no entry, it can either discard the corresponding address resolution request frame or, respectively, address resolution response frame or provide this frame with an E.164 group address with which all emulated LANs that have an access to the network CLSnet offering a connectionless service can be reached. In the latter instance, a group address agent GAA resolves this group address into the individual E.164 addresses of the individual customer premises equipment CPE of the individual ELANs ELAN1, ELAN2, ELAN3.

It is thereby especially beneficial when the E.164 group address that an interworking function attaches to an address resolution request or, respectively, address resolution response respectively contains the E.164 addresses of the customer premises equipment CPE of all emulated LANs ELAN2, ELAN3 that are connected to the network CLSnet offering a connectionless service, with the exception of the E.164 address of the customer premises equipment of its own ELAN ELAN1.

The group address agent GAA resolves the E.164 group address and sends copies of the packet with the address resolution request LE_ARP Request to said group of customer premises equipment CPE of the individual ELANs ELAN2, ELAN3. As a result thereof, all access LECs LEC Z2, LEC Z3 receive the address resolution request LE_ARP Request via the interworking function. Each access LEC LEC Z2, LEC Z3 recognizes the frame type as address resolution request and therefore sends the frame to the LAN emulation server LES of its emulated LAN ELAN2 or, respectively, ELAN3. Usually, any LAN emulation server LES can resolve the unicast destination MAC address of the destination LAN emulation client LEC B into the ATM address.

The return of an address resolution response is especially beneficially configured when the address resolution request LE_ARP Request has the E.164 address of the customer premises equipment CPE of the output ELAN ELAN1 attached to it upon encapsulation by the interworking function, when, upon de-encapsulation of the address resolution request, the output E.164 address of the address resolution request is stored in the customer premises equipment CPE of the ELAN2, and this output E.164 address, upon encapsulation of the address resolution response handed over by the LAN emulation server LES of the ELAN2 to the customer premises equipment CPE of the ELAN2 via the access LEC LEC Z2, is attached to the header part of the packet to be transmitted via the network CLSnet offering a connectionless service. As a result thereof, an immediate transmission of the address resolution response LE_ARP Response in encapsulated form to the customer premises equipment CPE of the ELAN1 is enabled by the network CLSnet offering a connectionless service.

The access LEC LEC Z1 in the output ELAN ELAN1 forwards the address resolution response LE_ARP Response to the output LEC LEC A after this has been encapsulated by the interworking function. After the output LEC LEC A has received the address resolution response LE_ARP Response with the destination ATM address, it sets up a direct ATM connection to the destination LEC LEC B via a regional or, respectively, global ATM network.

No modifications in the existing LAN emulation specification are required for the realization of the disclosed method for the coupling of ELANs. An access LEC must merely be signed on as proxy at the LAN emulation server LES and be connected via a customer premises equipment CPE to a network CLSnet offering a connectionless service. This access LEC then receives all unanswered address resolution requests LE_ARP Request from the LAN emulation server LAN of the corresponding, emulated LANs ELAN1, ELAN2, ELAN3.

The existing networks such as, for example, SMDS or CBDS offering a connectionless service also need not be modified either in terms of their standards or in terms of their specifications. An E.164 group address with all individual CPE addresses with which emulated LANs can be reached must merely be defined within this network. A mechanism can thereby be potentially provided that precludes an addressing of the sending customer premises equipment CPE.

A second example of a connection setup explained in greater detail below with reference to FIG. 2 provides for the address resolution of a multicast/broadcast destination MAC address by the CLS network and the setup of point-to-point or, respectively, point-to-multipoint ATM connections from the sender to the receivers.

The basic idea is thereby to learn the ATM addresses of a plurality of receiver LAN emulation clients LEC B. LEC C with LE_ARP Request for a multicast/broadcast MAC address and to set up point-to-point or point-to-multipoint ATM connections to these LAN emulation clients LEC B, LEC C.

FIG. 2 shows the same network configuration as FIG. 1. The signal flow of the address resolution request LE_ARP Request ensues in the same way as described in conjunction with FIG. 1. Since, however, a multicast/broadcast MAC address whose group members are the LAN emulation clients LEC B and LEC C in the ELANs ELAN2 and ELAN3 is to be resolved, an address resolution response LE_ARP Response is transmitted to the source LEC LECA in the ELAN1 not only from the LAN emulation server LES of the ELAN2, as in the example described with reference to FIG. 1, but is also transmitted from the LES of the ELAN3. After receipt of all address resolution responses LE_ARP Response, a point-to-multipoint connection setup to the LAN emulation clients LEC B and LEC C is initiated from the source LEC LEC A. The connection setup within the network is thereby shown by the bold face solid lines with arrow point in the direction of the connection setup.

As in the preceding example, the access LEC LEC Z1, LEC Z2, LEC C3 is respectively signed on as proxy at the LAN emulation server LES of its ELAN ELAN1, ELAN2, ELAN3 for the realization of the example described with reference to FIG. 2 in order to receive all unanswerable address resolution requests from the LAN emulation server LES.

Differing from the preceding example, a multicast/broadcast MAC address is resolved here. The LAN emulation specification forbids the transmission of LE_ARP Requests for the resolution of multicast MAC addresses. This limitation must be revoked.

The LE_ARP Request for the broadcast MAC address 48דł", i.e. the number "1"48 times, supplies the ATM address of the local broadcast-and-unknown server BUS. A global broadcast MAC address with which all LAN emulation clients of all ELANs that are linked to the CLS network can be addressed must be additionally defined.

The interworking function IWF is commented on in general below:

The IWF realizes the connection between the "access LEC" on the one hand and the CLS network on the other hand. The IWF for the coupling of ELANs by the CLS network handles MAC and E.164 addresses and is to be allocated to layer 2 according to the OSI reference model. I.e., the IWF is an ELAN-CLS bridge.

When the IWF is also to fulfill routing functions, it can also handle layer 3 addresses (for example, IP, IPX, etc.). This, however, is not required for the realization of the methods of the invention.

The protocol stack for coupling ELANs by the SMDS network or, respectively, by the CBDS network is respectively shown in the example in FIGS. 3A, 3B and 3C. The SMDS service is realized with the DCDB technology in the example according to FIG. 3A and is realized with the ATM technology in the example according to FIG. 3B. The CBDS service is realized with the ATM technology in the example according to FIG. 3C.

The IWF has the following jobs:

I. Readying the following parameters:

I.1. Receiver E.164 address

To this end, the IWF must maintain a table with MAC addresses and the corresponding E.164 addresses. For example, the entries in the table are set by network management but can also be filled out on the basis of the sender MAC address and sender E.164 address of the arrived CLS packets and be deleted after a certain time.

I.2. Sender E.164 address

This is the E.164 address of the IWF.

II. Handling the frames according to the destination MAC address:

II.1. Unicast/multicast LE_ARP Requests/Responses for which no entry is present are either discarded or provided with a global E.164 broadcast group address and routed to the CLS network.

II.2. Unicast/multicast LE_ARP Requests/Responses for which an entry is present are handed over to the CLS network.

II.3. Frames with local broadcast MAC address Idata and LE_ARP Requests) are discarded.

II.4. Unicast/multicast LE_ARP Requests/Responses with global broadcast MAC address are provided with the global E.164 group address and routed to the CLS network.

Only LE_ARP Requests/Responses are relevant for the realization of the present invention.

A first realized example for the incorporation of an above-described interworking function between an ELAN and a wide-area network offering a connectionless service for that case wherein the connectionless service is a "switched multi-megabit data service" SMDS and the wide-area network for the realization of this service is a "distributed queue dual bus" DQDB can provide that—at the wide-area network side—the protocol layers SMDS interface protocol layer 1, SIP_1, SMDS interface protocol layer 2, SIP_2, and SMDS interface protocol layer 3, SIP_3 are provided and that the interworking function communicates at the wide-area network side with the SMDS interface protocol layer 3, SIP_3.

At, for example, the ELAN side, the protocol layers physical layer, PHY, asynchronous transfer mode layer, ATM, asynchronous transfer mode adaption layer-5, AAL5, and LAN emulation client layer, LEC, are provided, whereby the interworking function communicates at the ELAN side with the LAN emulation client layer, LEC.

In another example, the connectionless service can be a "switched multi-megabit data service" (SMDS) and the wide-area network for the realization of this service can be an ATM network, whereby the protocol layers physical layer, PHY, asynchronous transfer mode layer, ATM, segmentation and assembling sub-layer of the asynchronous adaption layer-3/4, AAL3/4SAR, and SMDS interface protocol layer 3, SIP_3 are provided at the wide-area network side, and whereby the interworking function communicates at the wide-area network side with the SMDS interface protocol layer 3, SIP_3.

In a further example, the connectionless service can be a "connectionless broadband data service" CBDS, and the wide-area network for the realization of this service can be an ATM network, whereby—at the wide-area network side—the protocol layers physical layer, PHY, asynchronous transfer mode layer, ATM, asynchronous transfer mode adaption layer-3/4, AAL3/4, and connectionless network access protocol layer, CLNAP, are provided, and whereby the interworking function communicates at the wise-area network side with the connectionless network access protocol layer, CLNAP.

The meanings of the abbreviations employed are recited below in the form of the technical terms according to the applicable standards:

| | |
|---|---|
| AAL | ATM adaptation layer |
| ATM | asynchronous transfer mode |
| BUS | broadcast and unknown server |
| CBDS | connectionless broadband data service |
| CLNAP | connectionless network access protocol |
| CLNIP | connectionless network interface protocol |
| CLNP | connectionless network protocol |
| CLS | connectionless service/server |
| CPE | customer premises equipment |
| CRC | cyclic redundancy check |
| DQDB | distributed queue dual bus |
| DS1 | digital signal 1 |
| DS3 | digital signal 3 |
| E1 | European transmission level 1 |
| E3 | European transmission level 3 |
| ELAN | emulated local area network |
| ESIG | European SMDS Interest Group |
| ETSI | European Telecommunications Standards Institute |

-continued

| | |
|---|---|
| FR | frame relay |
| GAA | group address agent |
| IEEE | Institute of Electrical and Electronics Engineers |
| IP | Internet protocol |
| IPX | internetwork packet exchange |
| ITU-T | International Telecommunications Union-Telecommunications |
| IWF | interworking function |
| L3_PDU | Level 3 protocol data unit |
| LAN | local area network |
| LE_ARP | LAN emulation address resolution protocol |
| LEC | LAN emulation client |
| LECS | LAN emulation configuration server |
| LES | LAN emulation server |
| LLC | logical link control |
| MAC | media access control |
| OSI | open systems interconnection |
| PDU | protocol data unit |
| PHY | physical layer |
| SIG | SMDS Interest Group |
| SIP_3 | SMDS interface protocol layer 3 |
| SMDS | switched multi-megabit data service |
| SPX | sequenced packet exchange |
| TCP | transmission control protocol |
| TP | transport protocol |
| UBR | unspecified bit rate |
| WAN | wide area network |

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transmitting information packets between a source local area network emulation client (LED) of a first emulated local area network (ELAN) and at least one destination LED of at least a second ELAN, comprising the following method steps:

determining a destination asynchronous transfer mode (ATM) address of said destination LED by transmitting an address resolution request directly from a first LAN Emulator Server (LES) of said first ELAN over a connectionless service/services (CLS) wide-area network offering, a connectionless service to a second LAN Emulator Server (LES) located on said second ELAN without using any intermediate address server and by resolving the destination media access control (MAC) address of said destination LED of the second ELAN into the ATM address of said destination LED;

initiating a connection setup between the source LED and the destination LED via an ATM network ranking higher than the first ELAN and the second ELAN using the destination ATM address provided directly by said second LES;

transmitting information packets via the higher-ranking ATM netwvork.

2. The method according to claim 1 for transmitting information packets between a source LEC of a first ELAN and a single destination LEC of a second ELAN, wherein, for determining the destination ATM address, the source LEC sends an address resolution request to an LES of the first ELAN; wherein an address resolution request that cannot be resolved by any LES of the first ELAN is supplied via a network access device of the first ELAN for transmission into the CLS wide-area network; and wherein the address resolution request transmitted to the second ELAN is transmitted to an LES of the second ELAN via a network access device.

3. The method according to claim 1 for transmitting information packets between a source LEC of a first ELAN and a plurality of destination LEC of at least a second ELAN, wherein, for determining the destination ATM addresses, the source LEC sends an address resolution request to a server of a LAN emulation service of the first ELAN; wherein an address resolution request that cannot be resolved within the first ELAN is supplied via a network access device of the first ELAN for transmission into the CLS wide-area network; and wherein the address resolution request transmitted to the ELANs of the destination LECs is respectively transmitted via a network access device to a server of the LAN emulation service of each of the ELANs.

4. The method according to claim 3, wherein the address resolution request supplied into the CLS wide-area network is communicated to a group address agent of the CLS wide-area network for determining individual CLS wide-area network terminal addresses of the ELANs of all destination LECs and to subsequently communicate the address resolution inquiry to the ELANs of the destination LECs.

5. The method according to claim 1, wherein the ATM address determined in the second ELAN by resolving the destination MAC address is transmitted to the first ELAN as address resolution response via the wide-area network offering a connectionless service, and is transmitted thereat to the source LEC; and wherein the source LEC initiates a connection setup to the destination LEC via the higher-ranking ATM network.

6. The method according to claim 2, wherein a specific LED is provided as part of the network access device within every ELAN, said specific LED receiving all address resolution requests that cannot be resolved by the LES of the respective ELAN and outputting the requests to an interlocking function provided as bridge between the wide-area network offering a connectionless service and the respective ELAN; wherein the interlocking function transforms frames respectively coming from the allocated ELAN into a frame format of the wide-area network and hands these packets over to the CLS wide-area network; and the interlocking function transforms information packets addressed to the ELAN allocated to the interworking function from the CLS wide-area network into the ELAN frame format and outputs the transformed packets to the specific LED.

7. The method according to claim 6, wherein the interworking function handles address resolution request frames coming from the allocated ELAN and address resolution response frames according to their destination MAC address in the following way:

address resolution requests and address resolution responses for which no entry is present are discarded; and address resolution requests and address resolution responses for which an entry is present in the interworking function are handed over to the CLS wide-area network.

8. The method according to claim 6, wherein the interworking function handles address resolution request frames coming from the allocated ELAN and address resolution response frames according to their destination MAC address in the following way:

address resolution requests and address resolution responses for which no entry is present are communicated to the CLS wide-area network provided with a group address of the CLS wide-area network, whereby this group address addresses all ELANs connected to the CLS wide-area network; and address resolution requests and address resolution responses for which an entry is present in the interworking function are handed over to the CLS wide-area network.

9. The method according to claim 6, wherein the interworking function handles data frames coming from the allocated ELAN according to their destination MAC address in the following way:

data frames for which no entry is present are discarded; and data frames for which an entry is present are communicated to the CLS wide-area network.

10. The method according to claim 6, wherein the interworking function always discards unicast data frames coming from the allocated ELAN.

11. The method according to claim 3, wherein a specific LEC is provided as part of the network access device within every ELAN, said specific LEC receiving all address resolution requests that cannot be resolved by the LES of the respective ELAN and outputting the requests to an interworking function provided as bridge between the wide-area network offering a connectionless service and the respective ELAN; wherein the interworking function transforms frames respectively coming from the allocated ELAN into a frame format of the wide-area network and hands these packets over to the CLS wide-area network; and the interworking function transforms information packets addressed to the ELAN allocated to the interworking function from the CLS wide-area network into the ELAN frame format and outputs the transformed pockets to the specific LEC.

12. The method according to claim 11, wherein the interworking function handles address resolution request frames coming from the allocated ELAN and address resolution response frames according to their destination MAC address in the following way:

address resolution requests and address resolution responses for which no entry is present are discarded; and address resolution requests and address resolution responses for which an entry is present in the interworking function are handed over to the CLS wide-area network.

13. The method according to claim 11, wherein the interworking function handles address resolution request frames coming from the allocated ELAN and address resolution response frames according to their destination MAC address in the following way:

address resolution requests and address resolution responses for which no entry is present are communicated to the CLS wide-area network provided with a group address of the CLS wide-area network, whereby this group address addresses all ELANs connected to the CLS wide-area network; and address resolution requests and address resolution responses for which an entry is present in the interworking function are handed over to the CLS wide-area network.

14. The method according to claim 11, wherein the interworking function handles data frames coming from the allocated ELAN according to their destination MAC address in the following way:

data frames for which no entry is present are discarded; and data frames for which an entry is present are communicated to the CLS wide-area network.

15. The method according to claim 11, wherein the interworking function always discards unicast data frames coming from the allocated ELAN.

16. The method according to claim 1, wherein a specific LEC is provided as part of the network access device within every ELAN, said specific LEC receiving all address resolution requests that cannot be resolved by the LES of the respective ELAN and outputting the requests to an interworking function provided as bridge between the wide-area network offering a connectionless service and the respective ELAN; wherein the interworking function transforms frames respectively coming from the allocated ELAN into a frame format of the wide-area network and hands these packets over to the CLS wide-area network; and the interworking function transforms information packets addressed to the ELAN allocated to the interworking function from the CLS wide-area network into the ELAN frame format and outputs the transformed pockets to the specific LEC.

17. The method according to claim 16, wherein the interworking function handles address resolution request frames coming from the allocated ELAN is and address resolution response frames according to their destination MAC address in the following way:

address resolution requests and address resolution responses for which no entry is present are discarded; and address resolution requests and address resolution responses for which an entry is present in the interworking function are handed over to the CLS wide-area network.

18. The method according to claim 16, wherein the interworking function handles address resolution request frames coming from the allocated ELAN and address resolution response frames according to their destination MAC address in the following way:

address resolution requests and address resolution responses for which no entry is present are communicated to the CLS wide-area network provided with a group address of the CLS wide-area network, whereby this group address addresses all ELANs connected to the CLS wide-area network; and address resolution requests and address resolution responses for which an entry is present in the interworking function are handed over to the CLS wide-area network.

19. The method according to claim 16, wherein the interworking function handles data frames coming from the allocated ELAN according to their destination MAC address in the following way:

data frames for which no entry is present are discarded; and ldata frames for which an entry is present are communicated to the CLS wide-area network.

20. The method according to claim 16, wherein the interworking function always discards unicast data frames coming from the allocated ELAN.

* * * * *